(12) United States Patent
Kuperman

(10) Patent No.: US 12,031,589 B2
(45) Date of Patent: Jul. 9, 2024

(54) CLUTCH HUB ASSEMBLY PROVIDING ADDED STRENGTH AND STABILITY

(71) Applicant: Frank C Kuperman, Waxhaw, NC (US)

(72) Inventor: Frank C Kuperman, Waxhaw, NC (US)

(73) Assignee: REVMAX PERFORMANCE, LLC, Charlotte, NC (US)

( * ) Notice: Subject to any disclaimer, the term of this patent is extended or adjusted under 35 U.S.C. 154(b) by 0 days.

(21) Appl. No.: 17/568,169

(22) Filed: Jan. 4, 2022

(65) Prior Publication Data

US 2022/0213936 A1 Jul. 7, 2022

Related U.S. Application Data

(60) Provisional application No. 63/133,489, filed on Jan. 4, 2021.

(51) Int. Cl.
  *F16D 13/64* (2006.01)
  *F16D 1/10* (2006.01)

(52) U.S. Cl.
  CPC ............. *F16D 13/644* (2013.01); *F16D 1/10* (2013.01); *F16D 13/646* (2013.01); *F16D 2001/103* (2013.01)

(58) Field of Classification Search
  CPC .......... F16D 13/52; F16D 13/60; F16D 13/62; F16D 13/644; F16D 13/646; F16D 13/648; F16D 13/683; F16D 25/0638; F16D 13/72; F16D 13/74; F16D 25/123; F16D 1/10; F16D 2001/103; Y10T 74/1987

See application file for complete search history.

(56) References Cited

U.S. PATENT DOCUMENTS

| | | | |
|---|---|---|---|
| 8,579,097 B2 * | 11/2013 | Kanai | F16D 23/12 192/70.23 |
| 9,719,579 B2 * | 8/2017 | Torii | F16D 13/385 |
| 2004/0159521 A1 * | 8/2004 | Yamamura | F16H 63/3026 192/70.12 |
| 2008/0293536 A1 * | 11/2008 | Diosi | F16D 13/74 475/278 |
| 2013/0008757 A1 * | 1/2013 | Mizuno | F16D 13/52 192/66.31 |

* cited by examiner

*Primary Examiner* — Richard M Lorence
(74) *Attorney, Agent, or Firm* — Seth L. Hudson; Maynard Nexsen PC

(57) ABSTRACT

A clutch hub assembly includes a hollow shaft extending in the longitudinal direction having an internal surface, an external surface, a first end, and a second end. A plate is engaged to the external surface of the shaft, extending outwardly from the external surface of the shaft in the radial direction and having a top surface and a bottom surface. A collar is engaged to the plate having an internal surface and an external surface, wherein the top surface of the plate and the internal surface of the collar define a cavity. A plurality of teeth radially extending from the external surface collar, and a support member extends outwardly from the collar.

7 Claims, 4 Drawing Sheets

CLUTCH HUB ASSEMBLY PROVIDING ADDED STRENGTH AND STABILITY

CROSS REFERENCE TO RELATED APPLICATION

The present patent application/patent claims the benefit of priority of co-pending U.S. Provisional Patent Application No. 63/133,489, filed on Jan. 4, 2020, and entitled "CLUTCH HUB PROVIDING ADDED STRENGTH AND STABILITY," the contents of which are incorporated in full by reference herein.

FIELD OF THE INVENTION

The present invention relates generally to a clutch hub assembly and more generally relates to a clutch hub assembly for providing strength and stability and preventing flexing of the support portion.

BACKGROUND OF THE INVENTION

A clutch for a vehicle transmission may use a plurality of plates can be utilized to transmit torque or apply a braking force. The plates may include friction clutch plates and steel plates forming a clutch pack. The plates may be mounted to a clutch hub, which is positioned between a clutch basket and a pressure plate. The clutch hub rotates with the main shaft and during use the plates may overheat, causing damage. Oil may be directed to flow over the plurality of plates to lubricate and cool the plates.

BRIEF SUMMARY OF THE INVENTION

According to an embodiment of the present invention, a clutch hub assembly includes a shaft, a plate engaged to the shaft, extending outwardly from the shaft in the radial direction having a top surface and a bottom surface. A collar is engaged to the plate, wherein the plate and the collar define a cavity. A plurality of teeth radially extend from the collar, and a support member extends outwardly from the collar.

According to another embodiment of the present invention, the clutch hub assembly includes a plurality of teeth that extend from an upper edge of the collar to the top surface of the support member.

According to yet another embodiment of the present invention, the clutch hub assembly includes a passageway extending between an outer surface of each tooth to the bottom surface of the plate.

According to yet another embodiment of the present invention, the clutch hub assembly includes a plate engaged to a side portion of the collar.

According to yet another embodiment of the present invention, the clutch hub assembly includes a notch disposed adjacent the top surface of the support member.

According to yet another embodiment of the present invention, the clutch hub assembly includes a hollow shaft extending in the longitudinal direction having an internal surface, an external surface, a first end, and a second end. A plate is engaged to the external surface of the shaft, extending outwardly from the external surface of the shaft in the radial direction and having a top surface and a bottom surface. A collar is engaged to the plate having an internal surface and an external surface, wherein the top surface of the plate and the internal surface of the collar define a cavity. A plurality of teeth radially extending from the external surface collar, and a support member extends outwardly from the collar.

According to yet another embodiment of the present invention, the clutch hub assembly includes a plurality of splines extending axially from the external surface of the second end of the shaft.

According to yet another embodiment of the present invention, the clutch hub assembly includes a support member that is circular and surrounds the external surface of the collar.

According to yet another embodiment of the present invention, the clutch hub assembly includes a plurality of top holes disposed within the top surface of the plate and adjacent the shaft, corresponding bottom holes disposed on the bottom surface of the plate with a passageway extending between each top hole to each bottom hole, wherein the passageways are angled between each top hole to each bottom hole.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
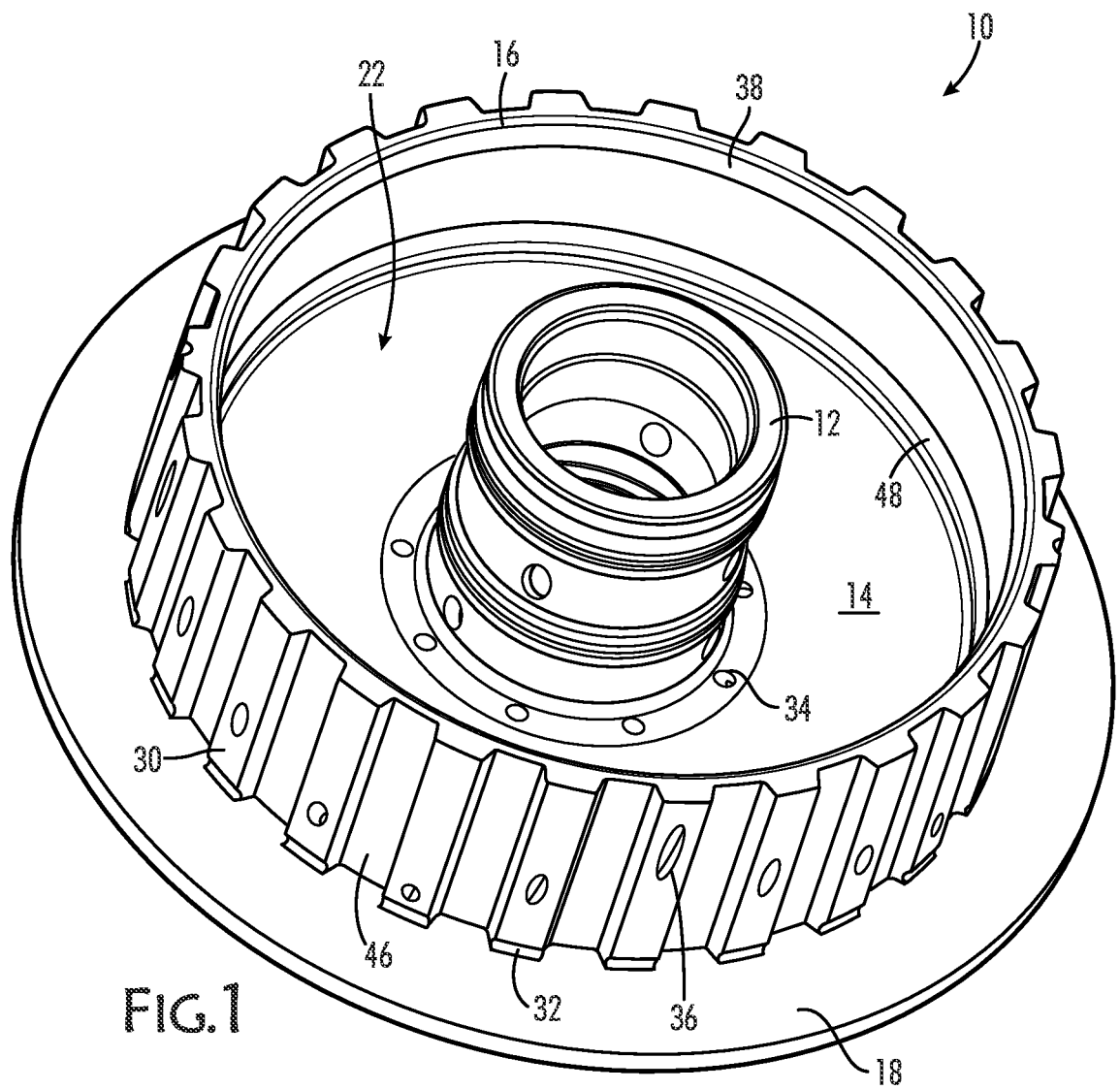
FIG. 1 is a top perspective view of the clutch hub assembly of the present invention.

Referring now specifically to the drawings, a clutch hub assembly is illustrated in FIG. 1 and is shown generally at reference numeral 10. The clutch hub assembly 10 comprises a shaft 12, a plate 14, a collar 16, and a support member 18. The shaft 12 is a hollow shaft, with a generally circular cross-section, extending in the longitudinal direction of the clutch hub assembly 10 with an internal surface and an external surface. An interior void is defined by the internal surface of the shaft 12 and extends from a first end to the second end of the shaft 12. The plate 14 extends outwardly from the external surface of the shaft 12 in the radial direction. The first end of the plate 14 is engaged to the external surface of the shaft 12 at a predetermined distance along the shaft 12 and the collar 16 is disposed on the second end of the plate 12. The shaft 12 and plate 14 are engaged to each other and preferably integral to each other, wherein the shaft 12 and plate 14 rotate together during use.

Figure 4:
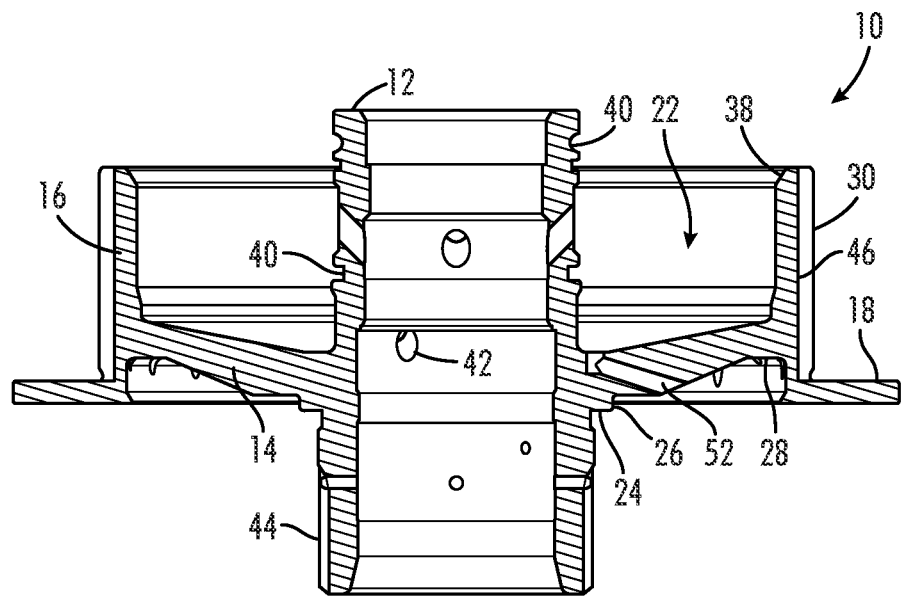
FIG. 4 is a cut-away view of the clutch hub assembly of the present invention along the line 4-4 of FIG. 3.
Figure 5:
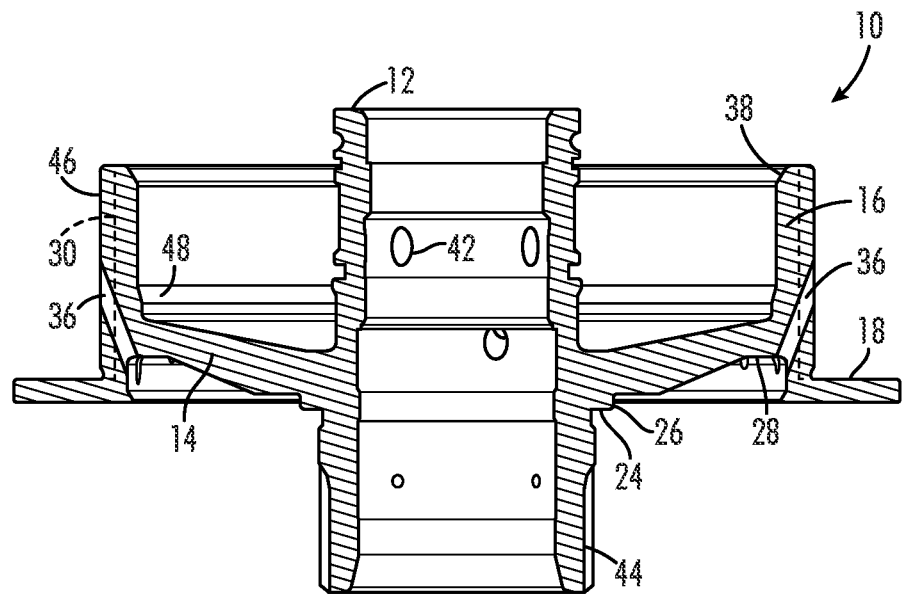
FIG. 5 is a cut-away view of the clutch hub assembly of the present invention along the line 5-5 of FIG. 3.

The collar 16 extends in the longitudinal direction of the clutch hub assembly 10 and parallel to the longitudinal axis of the shaft 12. A first portion of the collar 16 extends in a first direction away from the plate 14, and a second portion of the collar 16 extends in a second direction, opposite the first direction, away from the plate 14, resulting in the collar 16 extending away from both the top surface and bottom surface of the plate 14, as illustrated in FIGS. 4 and 5. The second end of the plate 14 is engaged to the collar 16 along the side portion and not an end portion of the collar 16. In other words, the second end of the plate 14 is engaged to a side portion of the collar 16 disposed between the first portion and the second portion of the collar 16.

The plate 14 preferably extends outwardly and upwardly from the external surface of the shaft 12 and completely surrounds the shaft 12. The top surface of the plate 14 preferably contains a smooth surface without any ridges, slots, or protrusions. The top surface of the plate 14 is angled towards the second end of the plate 14. As shown in FIGS. 4 and 5, the top surface of the plate adjacent the external surface of the shaft 12 is not angled for a predetermined distance, but instead extends in the radial direction from the shaft, perpendicular to the longitudinal axis of the shaft 12, for a predetermined distance. After the predetermined distance, the top surface of the plate 14 is angled towards the second end of the plate 14 in the direction of the first end of the shaft 12. The external surface of the shaft 12, the top surface of the plate 14, and the internal surface of the collar 16 define a cavity 22.

Figure 2:
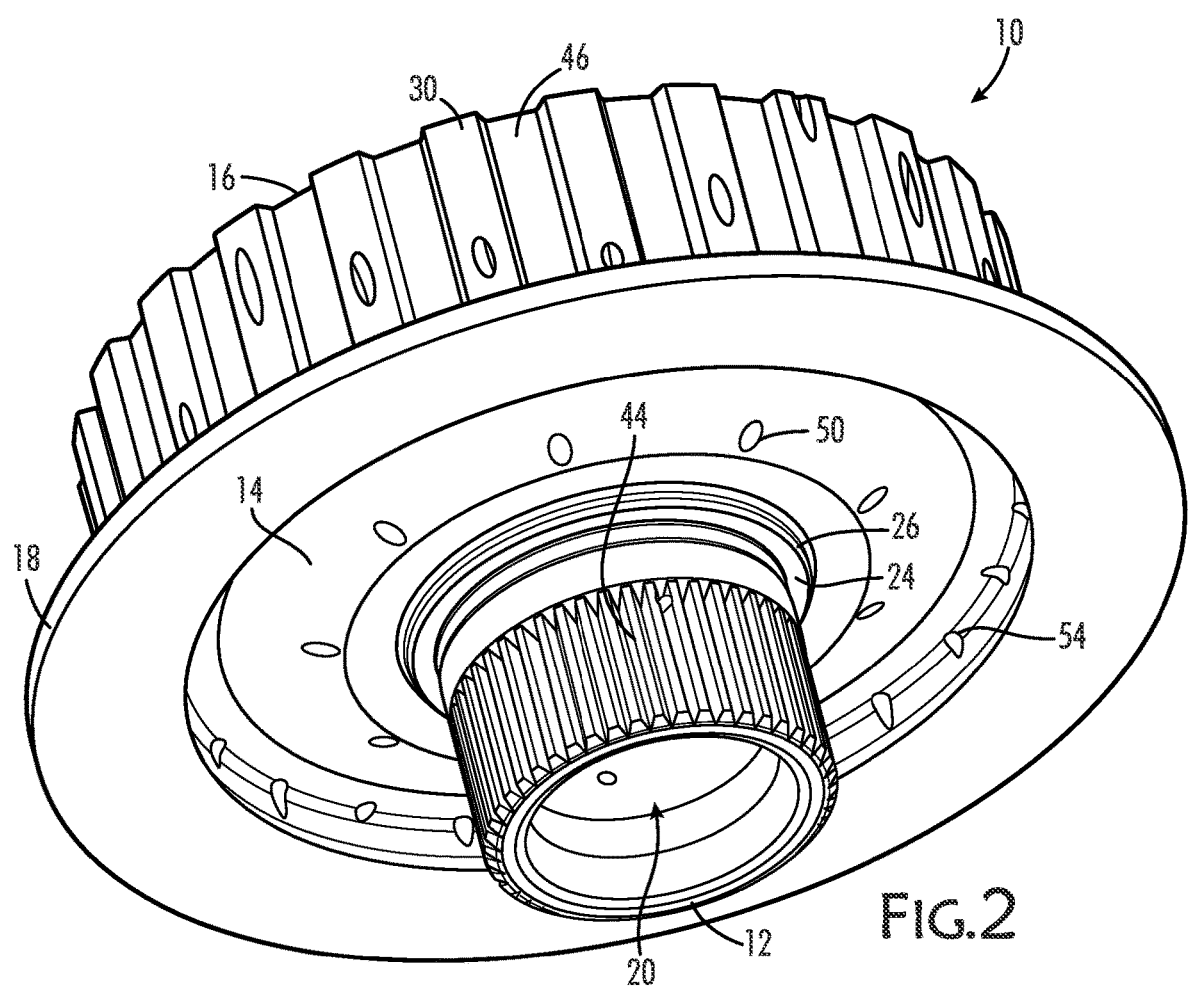
FIG. 2 is a bottom perspective view of the clutch hub assembly of the present invention.
Figure 3:
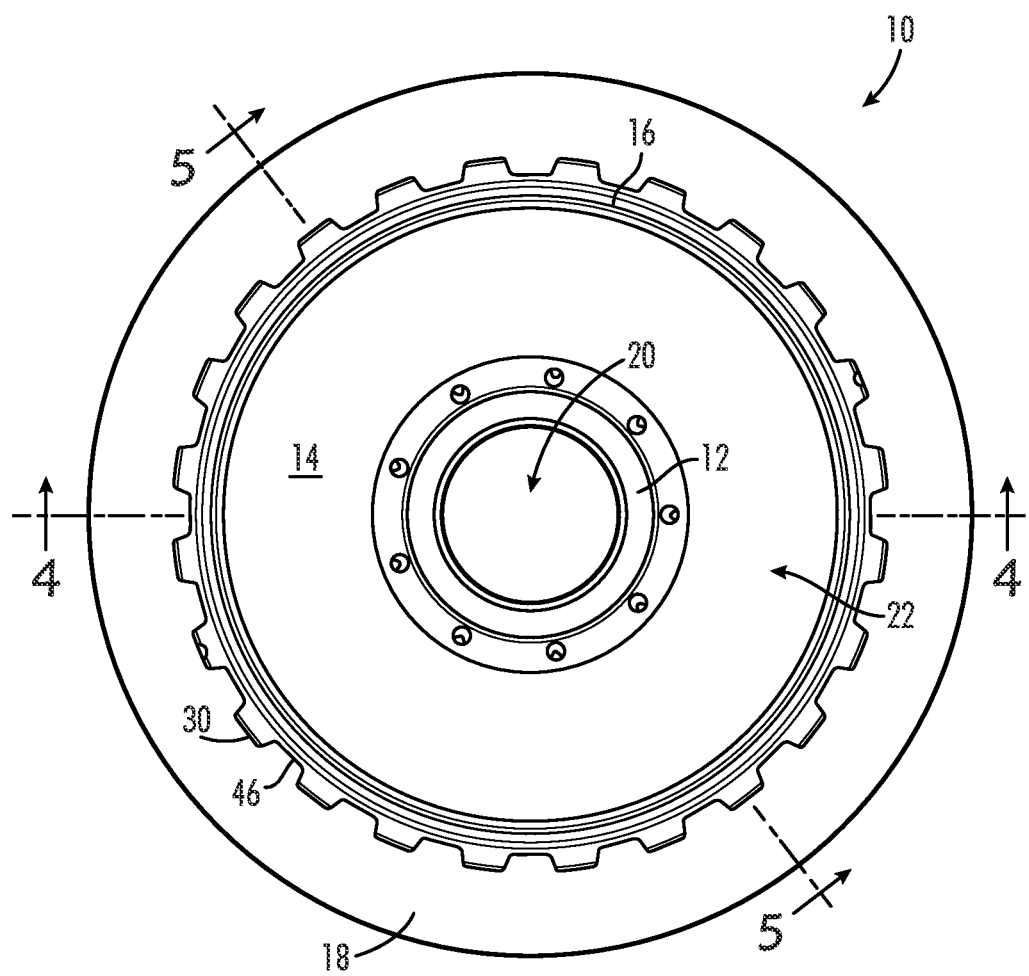
FIG. 3 is a top view of the clutch hub assembly of the present invention.

The bottom surface of the plate 14 contains a ring 24 disposed adjacent the external surface of the shaft 12. The ring 24 circumvents the external surface of the shaft 12, creating a shoulder 26 disposed between the ring 24 and bottom surface of the plate 14. The ring 24 extends in the radial direction and perpendicular to the longitudinal axis of the shaft 12. The bottom surface of the plate 14 is angled, similar to the angle of the top surface of the plate 14 to a transition 28 disposed adjacent the second end of the plate 14 and adjacent the internal surface of the collar 16. The top surface of the plate 14 contains a plurality of holes 34 spaced an equal distance apart circumferentially around the shaft 12, as shown in FIG. 1. The holes 34 correspond to holes 50 disposed on the bottom surface of the plate 14, as shown in FIG. 2, and a passageway 52 extends between each of the holes 34 disposed on the top surface of the plate 14 to each of the holes 50 disposed on the bottom surface of the plate 14, as shown in FIG. 4. The passageways 52 allow oil to flow there through from an area external to the clutch hub assembly 10 and an interior portion of the clutch hub assembly 10.

The support member 18 extends outwardly from the second portion of the collar 16. The support member 18 extends in the radial direction and perpendicular to the longitudinal axis of the shaft 12. The support member 18 has a top surface and a bottom surface and is generally circular and completely surrounds the collar 16. The top and bottom surface of the support member 18 is a smooth surface without any channels, grooves, indentations on either the top or bottom surface. When in use, the support member 18 extends to the outer edge of an adjacent steel pressure plate (not shown) to support the steel pressure plate, thus the support member 18 increases the strength and stability of the clutch hub assembly 10 over prior art versions.

A plurality of teeth 30 circumferentially surround the external surface of the collar 16 and extend radially outward from the collar 16. The teeth 30 are preferably spaced an equal distance apart along the external surface of the collar 16. The top portion of the teeth 30 are preferably aligned with the upper edge of the collar 16 and extend to a bottom portion that engages the top surface of the support member 18. The bottom portion of the teeth 30 contain a notch 32 disposed adjacent the top surface of the support member 18. The teeth 30 are machined in the manufacturing process and provide additional contact points because they extend from the upper edge of the collar 16 to the top surface of the support member 18, thus preventing flexing of the clutch backing plate. The teeth 30 have two side portions that extend between the top portion and the bottom portion of the teeth 30. The side portions are opposed each other and extend from a top surface of the teeth 30 to the external surface of the collar 16 on each side of each tooth 30. A channel 46 is defined by the side portion of a tooth 30, the side portion of an adjacent tooth 30, and the external surface of the collar 16. A channel 46 is disposed between the teeth 30 along the external surface of the collar 16, resulting in a plurality of channels 46 disposed between the plurality of teeth 30.

A shelf 38 may be disposed on the internal surface of the collar 16. The shelf 38 is formed by a chamfered portion adjacent the upper edge of the collar 16. The shelf 38 extends from the upper edge of the collar 16 and into the cavity 22 on the internal surface of the collar 16 and disposed along the entire circumference of the upper edge of the collar 16, as shown in FIGS. 1, 4, and 5. A snap ring, spacer, or o-ring (not shown) may be placed adjacent the shelf during operation. At least one slot (not shown) may be disposed within the internal surface of the collar 16. Alternatively, two pairs of slots may be disposed within the internal surface of the collar 16 and continuous along the entire circumference of the internal surface of the collar 16. The slots may be disposed near the first portion of the collar 16 or adjacent or in close proximity to the upper edge of the collar 16. Snap rings (not shown) may be inserted into the slots during operation.

A lip 48 may be disposed on the opposite portion of the collar 16 from the shelf 38. The lip 48 is formed on the internal surface of the collar 16 on the second portion and adjacent the location where the second end of the plate 14 engages the collar 16. The lip 48 circumvents the internal surface of the collar 16 and while adjacent the second end of the plate 14, the lip 48 is spaced-apart from the second end of the plate 14. A snap ring, spacer, or o-ring (not shown) may be placed adjacent the shelf during operation.

Channels 40 are disposed on the external surface of the shaft 12. The channels 40 may be disposed at any position along the first end of the external surface of the shaft 12. As shown in FIGS. 4 and 5, one or more channels 40 may be adjacent to each other along the shaft 12 with one or more channels 40 spaced a distance away from one or more channels 40. Two channels 40 are disposed adjacent each other, wherein at least one of these channels 40 is positioned at a height the same as or higher than the upper edge of the collar 16. At least one additional channel 40 is located at another portion on the shaft 12. The channels 40 are designed to receive a spacer (not shown) during operation, wherein the internal edge of the spacer surrounding the internal bore is received within a channel 40 on the external surface of the shaft 12 and the external edge of the spacer is placed adjacent either the shelf 38 or lip 48, depending upon the specific channel 40 receiving the internal edge of the spacer and desires of the user.

A snap ring, spacer, or o-ring may be placed within the cavity 22 of the clutch hub assembly 10 so that it is adjacent the lip 48. In other words, a surface of a snap ring, spacer, or o-ring may be disposed adjacent the lip 48 with its external side adjacent the internal surface of the collar 16. A piston (not shown), which may be comprised of at least one piston seal and a clutch piston, is designed to be received within the cavity 22 of the clutch hub assembly 10 and a snap ring, spacer, or o-ring is disposed adjacent the lip 48, for retaining the piston within the appropriate position within the cavity 22 of the clutch hub assembly 10. A plurality of friction clutch plates (not shown) and separator clutch plates (not shown) may be positioned within the cavity 22 of the clutch hub assembly 10. The plurality of friction clutch plates and separator clutch plates may form a clutch pack. At least one snap ring, spacer, o-ring or release spring may be disposed within the cavity 22 and disposed between the piston, friction clutch plates, and/or separator clutch plates. A snap ring, spacer, and/or o-ring may be disposed adjacent the shelf 38, piston, friction clutch plates, separator clutch plates, and snap ring, spacer, o-ring and/or release spring within the cavity 22. A side of the snap ring, spacer, and/or o-ring is disposed adjacent the shelf 38 with its external side adjacent the internal surface of the collar 16.

A slot (not shown) may be disposed on the second portion of the collar 16 and adjacent or in close proximity to the top surface of the plate 14. Alternatively, a pair of slots may be disposed on the second portion of the collar 16 and adjacent or in close proximity to the top surface of the plate 14. The slot or pair of slots may be disposed within the internal surface of the collar 16 between the lip 48 and the second end of the plate 14. A snap ring, spacer, or o-ring may be placed with its outer side received within the slot or slots of the collar for retaining the piston within the appropriate position within the cavity 22 of the clutch hub assembly 10.

As shown in FIGS. 1, 2, and 5, a plurality of passageways 36 are disposed within the collar 16 extending from an opening within the teeth 30 to an opening 54 within the bottom surface of the plate 14 and collar 16. The passageways 36 extend through the teeth 30, collar 16, and plate 14. The passageways 36 allow oil to flow there through from an area external to the clutch hub assembly 10 and an interior portion of the clutch hub assembly 10. A plurality of bores 42 may also be disposed on the shaft 12, extending from the external surface to the internal surface and into the interior void 20. The openings 42 are spaced apart on the shaft 12 and preferably spaced an equal distance from each other on the shaft 12.

The second end of the shaft 12 contains a plurality of outwardly extending splines 44. The splines 44 extend radially from the external surface of the second end of the shaft 12. The clutch hub assembly 10 is preferably composed of aluminum and more preferably also contains an anodized coating, such as Mil-Spec Type III. The aluminum is preferably 7075-T6 that has a shear strength of 48,000 PSI.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A clutch hub assembly, comprising:
   a shaft having a longitudinal axis;
   a plate, engaged to the shaft, and extending outwardly from the shaft in the radial direction having a first surface and a second surface;
   a collar engaged to the plate, wherein the plate and the collar define a cavity;
   a support member extending outwardly from the collar containing a first surface;
   a plurality of teeth radially extending from the collar, wherein the teeth contain a notch disposed adjacent the first surface of the support member; and
   a passageway extending between an outer surface of each tooth to the second surface of the plate.

2. The clutch hub assembly according to claim 1, wherein the plurality of teeth extending from an edge of the collar to the first surface of the support member.

3. The clutch hub assembly according to claim 1, wherein the plate is engaged to a side portion of the collar.

4. A clutch hub assembly, comprising:
   a shaft having a longitudinal axis extending in a longitudinal direction having an internal surface, an external surface, a first end, and a second end;
   a plate, engaged to the shaft, and extending outwardly from the shaft in the radial direction having a first surface and a second surface;
   a collar engaged to the plate and extending outwardly to an outer edge, wherein the plate and the collar define a cavity;
   a support member extending outwardly from the collar containing a first surface;
   a plurality of teeth radially extending from the collar, wherein the teeth contain a notch disposed adjacent the first surface of the support member; and
   a passageway extending between an outer surface of each tooth to the second surface of the plate.

5. The clutch hub assembly according to claim 4, wherein the plate is engaged to a side portion of the collar.

6. The clutch hub assembly according to claim 4, wherein the support member is circular and surrounds the external surface of the collar.

7. The clutch hub assembly according to claim 4, further comprising a plurality of top holes disposed within the first surface of the plate and adjacent the shaft, corresponding bottom holes disposed on the second surface of the plate with a passageway extending between each top hole to each bottom hole, wherein the passageways are angled between each top hole to each bottom hole.

* * * * *